United States Patent
Kim et al.

(10) Patent No.: US 7,672,699 B2
(45) Date of Patent: Mar. 2, 2010

(54) DRIVING APPARATUS USING MAGNETIC SUBSTANCE FOR SLIDING TYPE PORTABLE WIRELESS TERMINAL

(75) Inventors: Jong-Yang Kim, Seoul (KR); Jong-Won Ha, Gumi-si (KR); Young-Chun Kim, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 645 days.

(21) Appl. No.: 10/561,226

(22) PCT Filed: Jun. 16, 2004

(86) PCT No.: PCT/KR2004/001478

§ 371 (c)(1),
(2), (4) Date: Mar. 26, 2007

(87) PCT Pub. No.: WO2004/112267

PCT Pub. Date: Dec. 23, 2004

(65) Prior Publication Data

US 2008/0051163 A1  Feb. 28, 2008

(30) Foreign Application Priority Data

Jun. 19, 2003  (KR) .................. 20 2003 0019379
Jun. 18, 2004  (KR) .................. 20 2004 0017132

(51) Int. Cl.
*H04M 1/00*  (2006.01)
(52) U.S. Cl. .................................................. 455/575.4
(58) Field of Classification Search ............... 455/575.4
See application file for complete search history.

(56) References Cited

U.S. PATENT DOCUMENTS

| | | | | |
|---|---|---|---|---|
| 5,956,625 A | * | 9/1999 | Hansen et al. | 455/575.4 |
| 6,136,131 A | * | 10/2000 | Sosnowski | 156/256 |
| 6,947,777 B2 | * | 9/2005 | Crum | 455/575.3 |
| 6,980,840 B2 | * | 12/2005 | Kim et al. | 455/575.4 |
| 2002/0137476 A1 | * | 9/2002 | Shin | 455/90 |
| 2005/0000059 A1 | | 1/2005 | Sung et al. | |

FOREIGN PATENT DOCUMENTS

| | | |
|---|---|---|
| EP | 1496674 | 1/2005 |
| JP | 09-205476 | 8/1997 |
| JP | 2003-348204 | 12/2003 |
| KR | 2002-74870 | 10/2002 |
| KR | 2003-27212 | 4/2003 |
| WO | WO 99/43135 | 8/1999 |

* cited by examiner

*Primary Examiner*—Lester Kincaid
*Assistant Examiner*—Yu (Andy) Gu
(74) *Attorney, Agent, or Firm*—Roylance, Abrams, Berdo & Goodman, LLP

(57) ABSTRACT

A driving apparatus enables a sliding-type portable wireless terminal to be opened or closed with reduced noise and through multiple stages of opening. The portable wireless terminal may have various functions corresponding to each of the multiple stages. The driving apparatus comprises: a main body; a sub body sliding in a longitudinal direction of the main body, so as to be opened from or closed onto the main body; a first magnetic module provided at a rear surface of the sub body and having a first magnet, the first magnet having a first polarity and extending in a longitudinal direction of the first magnet; and a second magnetic module provided at a front surface of the main body and having a second magnet, the second magnet having a second polarity and being opposed to the first magnet.

11 Claims, 21 Drawing Sheets

DRIVING APPARATUS USING MAGNETIC SUBSTANCE FOR SLIDING TYPE PORTABLE WIRELESS TERMINAL

TECHNICAL FIELD

The present invention relates to a portable wireless terminal, and more particularly to a sliding-type portable wireless terminal having a sub-body adapted to slide along the longitudinal direction of a main body to expose/cover the key pad of the main body.

BACKGROUND ART

In general, portable wireless terminals are classified into bar-type terminals, flip-type terminals, and folder-type terminals according to their appearance. Recently, the folder-type terminals have prevailed in the wireless terminal market, because it is easy to make them in a compact size with reduced weight. In addition, body-wearable type terminals and sliding-type terminals have appeared, in order to satisfy the diversified taste or desires of customers.

FIG. 1 is an exploded perspective view showing an embodiment of a driving apparatus of a sliding-type portable wireless terminal 100 according to the prior art. As shown in FIG. 1, the sliding-type portable wireless terminal 100 has a main body 101, a sub-body 102, and a spring module 150 which acts as a driving apparatus and which couples them in such a manner that they can slide relative to each other.

The sub-body 102 has a pair of sliding guides 127 positioned on its rear surface for smooth sliding. The sliding guides 127 preferably have the shape of an H-beam having lateral grooves (not shown), so that the sub-body 102 can slide in a stable manner and can be prevented from escaping from the main body 101. The sliding guides 127 are retained in coupling grooves 123, which are formed on the rear surface of the sub-body 102 along its longitudinal direction.

The spring module 150 has a rear cover 151, a front cover 153, and torsion springs 155.

The rear cover 151 is retained on the front surface of the main body 101. The rear cover 151 is positioned on the upper portion of the front surface of the main body 101 and a key pad (not shown) is positioned on the lower portion thereof.

The front cover 153 has sliding grooves 153*d* formed along its longitudinal direction, which corresponds to the sliding guides 127, and guide slits 153*c* formed along the longitudinal direction, which penetrates both the sliding grooves 153*d* and the interior of the front cover 153. The sliding grooves 153*d* are engaged with the lateral grooves of the sliding guides 127 so that the spring module 150 can slide on the slide guides 127. The upper surfaces of the sliding guides 127 are in communication with the interior of the front cover 153 via the guide slits 153*c*. The front cover 153 also has support holes 153*f* formed thereon for supporting the torsion springs 155. After being retained on the rear cover 151 and being coupled to the sliding guides 127 on the rear surface of the sub-body 102, the front cover 153 acts as a bridge which connects the main body 101 and the sub-body 102 to each other in such a manner that they can slide relative to each other.

Each torsion spring 155 has a coil 155*a*, a first retaining end 155*b* extending from an end of the coil 155*a*, and a second retaining end 155*c* extending from the other end of the coil 155*a*. The coils 155*a* of the torsion springs 155 are moved along a predetermined path within the rear cover 151. The first retaining ends 151*b* protrude to the exterior via the guide slits 153*c* of the front cover 153 and are retained on the sliding guides 127, which are positioned on the rear surface of the sub-body 102. The second retaining ends 155*c* are retained in the support holes 153*f* of the front cover 153. The torsion springs 155 accumulate an elastic force, which acts in such a direction that the first and second retaining ends 155*b* and 155*c* move away from each other. The elastic force enables the spring module 150 to provide a driving force which causes the sub-body 102 to slide on the main body 101.

However, such a sliding-type portable wireless terminal according to the prior art has a problem in that it generates a noise during opening/closing and the service life of the product is shortened by the friction among components because of the structure, which uses a spring module to generate a driving force. In particular, as the coil springs in the spring module are moved, they generate a noise and cause friction among components, which wears the components and shortens the service life of the product.

DISCLOSURE OF THE INVENTION

Therefore, the present invention has been made in view of the above-mentioned problems, and it is an object of the present invention to provide a driving apparatus of a sliding-type portable wireless terminal using a magnetic body capable of reducing noise when opening/closing its sub-body.

Another object of the present invention is to provide a driving apparatus of a sliding-type portable wireless terminal using a magnetic body capable of extending the service life of the product by minimizing the friction among its components when opening/closing its sub-body.

Still another object of the present invention is to provide a driving apparatus of a sliding-type portable wireless terminal using a magnetic body capable of opening/closing its sub-body in multiple steps so that the terminal can be endowed with various functions according to respective steps.

In order to accomplish above objects, there is provided a driving apparatus of a sliding-type portable wireless terminal using a magnetic body, the terminal having a main body and a sub-body adapted to slide along the longitudinal direction of the main body to be opened/closed, the driving apparatus comprising a first magnetic body module positioned on the rear surface of the sub-body and having a magnetic body fastened thereon, which has a predetermined polarity and which extends along the longitudinal direction thereof, and a second magnetic body module positioned on the front surface of the main body and having a magnetic body fastened thereon, which has a predetermined polarity and faces the magnetic body of the first magnetic body module.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention. In the following description of the present invention, a detailed description of known functions and configurations incorporated herein will be omitted when it may make the subject matter of the present invention rather unclear.

Figure 1:
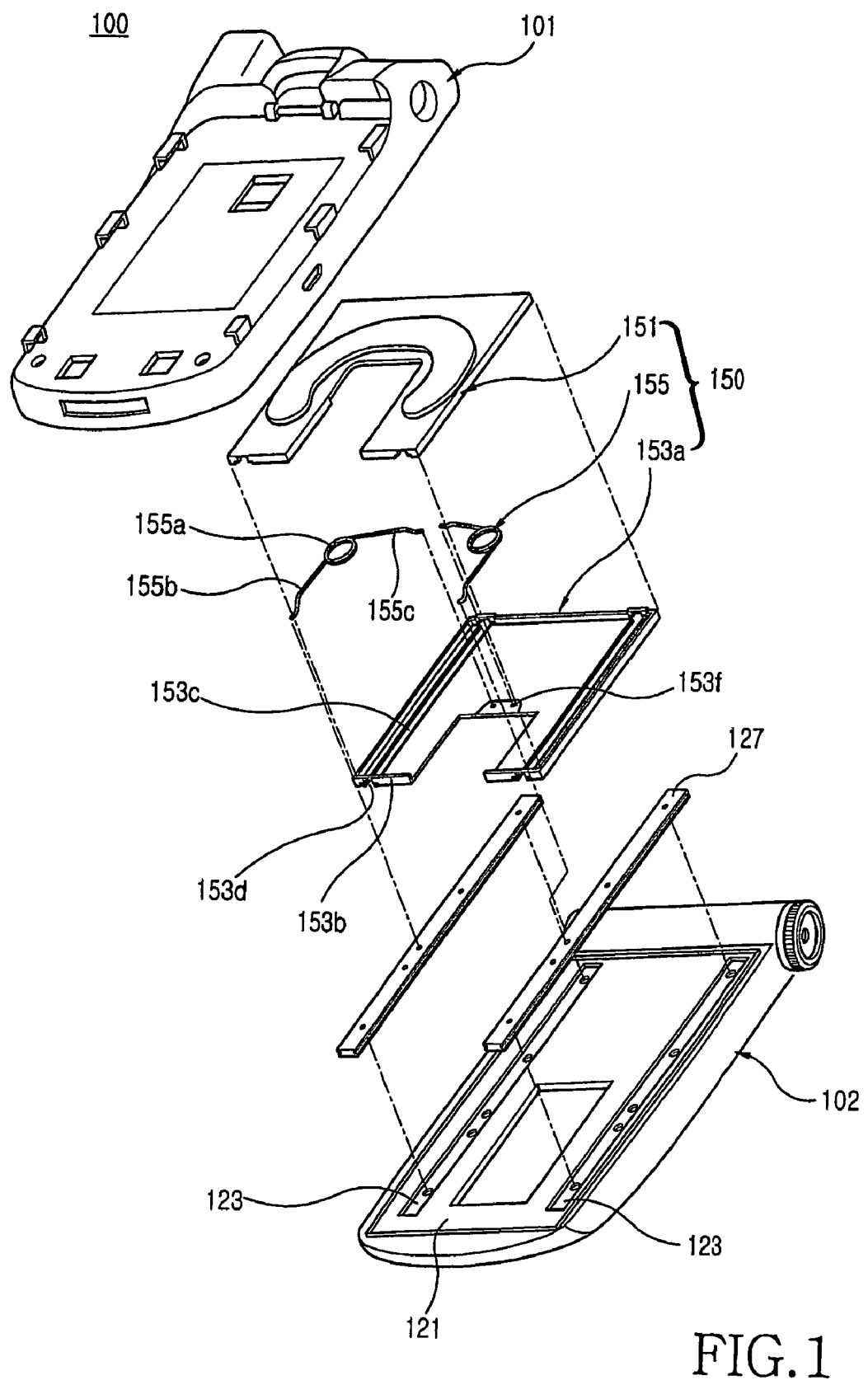
FIG. 1 is an exploded perspective view showing an embodiment of a driving apparatus of a sliding-type portable wireless terminal according to the prior art.
Figure 2:
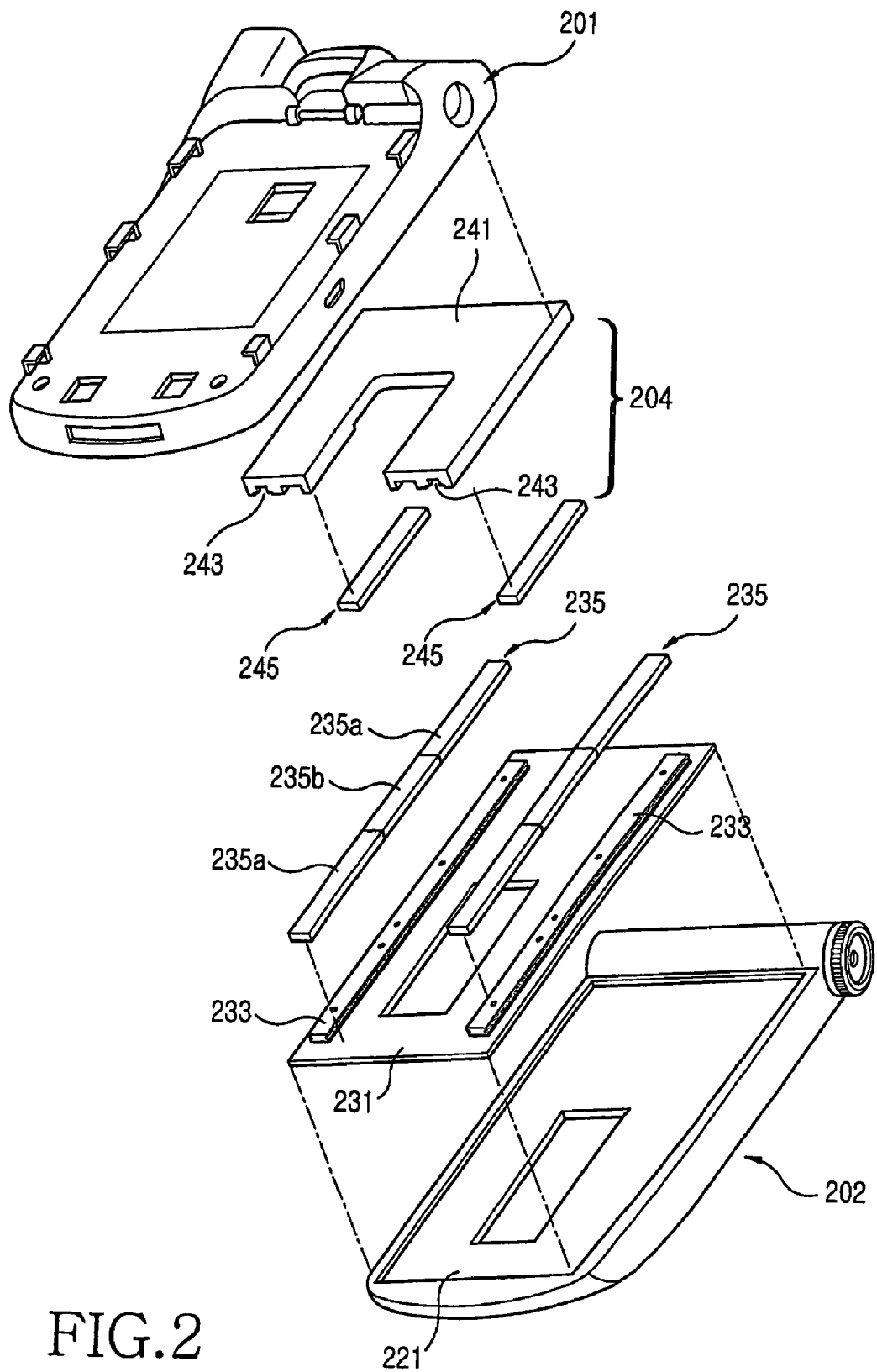
FIG. 2 is an exploded perspective view showing a first preferred embodiment of a driving apparatus of a sliding-type portable wireless terminal using a magnetic body according to the present invention.

FIG. 2 is an exploded perspective view showing a first preferred embodiment of a driving apparatus of a sliding-type portable wireless terminal 200 using a magnetic body according to the present invention. As shown in FIG. 2, the sliding-type portable wireless terminal 200 has a main body 201, a sub-body 202, and a driving apparatus including first and second magnetic body modules 203 and 204 for coupling the main body 201 and the sub-body 202 to each other in such a manner that they can slide relative to each other.

The main body 201 has, on its front surface, a key pad 211 (shown in FIG. 7) and a transmitter unit 213 (shown in FIG. 7) which contains a microphone therein. The key pad 211 and the transmitter unit 213 are exposed or covered as the sub-body 202 slides on the main body 201 along a longitudinal direction.

The sub-body 202 is coupled to the main body 201 in such a manner that it can slide thereon and is provided with, on its front surface, a receiver unit 217 (shown in FIG. 7) which contains a speaker phone therein, a display unit 215 which is composed of one chosen from various kinds of display devices, and a number of function keys 219. The sub-body 202 may have a seating surface 221 formed on its rear surface to install the driving apparatus.

The driving apparatus is composed of a first magnetic body module 203 positioned on the rear surface of the sub-body 202, particularly on the seating surface 221, and a second magnetic body module 204 positioned on the front surface of the main body 201.

The first magnetic body module 203 has a first base plate 231 retained on the seating surface 221 of the sub-body 202, a pair of sliding guides 233 retained on a surface of the first base plate 231 along the longitudinal direction thereof, and first magnetic bodies 235 fastened on a surface of the first base plate 231 inside of the sliding guides 233. The first magnetic body module 203 may be integrally formed on the seating surface 221 of the sub-body 202. Furthermore, any components may be chosen from the sub-body 202, the first base plate 231, the sliding guides 233, and the first magnetic bodies 235 according to their material and may be configured as an integrated part.

The polarity of the first magnetic bodies 235 is set in such a manner that the polarity of both ends 235a thereof is different from that of the central portion 235b thereof. For example, if both ends 235a of the first magnetic bodies 235 have the polarity of N. pole, the central portion 235b thereof has that of S. pole. Likewise, if both ends 235a of the first magnetic bodies 235 have the polarity of S. pole, the central portion 235b thereof has that of N. pole.

The second magnetic body module 204 is composed of a second base plate 241 retained on the front surface of the main body 201 and second magnetic bodies 245 fastened on the second base plate 241.

The second base plate 241 is provided with sliding grooves 243, which correspond to the sliding guides 233 of the first base plate 231. The sliding grooves 243 are engaged with the sliding guides 233 for sliding and prevent the sub-body 202 from escaping from the main body 201. For example, the sliding guides 233 are configured as H-beams having grooves (not shown) formed on both lateral surfaces thereof along the longitudinal direction thereof and the sliding grooves 243 have ribs (not shown) adapted to be engaged with the grooves of the siding guides 233, so that the second base plate 241 can slide on the first base plate 231.

The second magnetic bodies 245 are fastened on the second base plate 241 inside of the sliding grooves 243 and face the first magnetic bodies 235, which are fastened on the first base plate 231. The polarity of the second magnetic bodies 245 is set to be the same as that of the central portions 235b of the first magnetic bodies 235. For example, if the polarity of the central portions 235b of the first magnetic bodies 235 is set to be N. pole, the polarity of the second magnetic bodies 245 is also set to be N. pole.

Therefore, if the second magnetic bodies 245 face the central portions 235b of the first magnetic bodies 235, a repulsive force occurs due to the same polarity. The second magnetic bodies 245 are subject to drawing forces toward both ends 235a of the first magnetic bodies 235, because the polarity of the ends 235a of the first magnetic bodies 235 is different from that of the central portions 235b thereof. As a result, the second magnetic body module 204 remains stable when it is positioned either in the upper portion of the first magnetic body module 203 or in the lower portion thereof.

FIGS. 3 to 8 show the successive sliding of the sub-body 202 on the main body 201 of the sliding-type portable wireless terminal 200 configured as above.

The main body 201 is provided with, on the lower portion of its front surface, a key pad 211 and a transmitter unit 213 which contains a microphone therein. The sub-body 202 is adapted to slide on the main body 201 and is provided with, on its front surface, a display unit 215, a receiver unit 217 containing a speaker unit therein, and a key pad 219 composed of function keys including menu keys, a send key, an end key, and the like.

Figure 3:
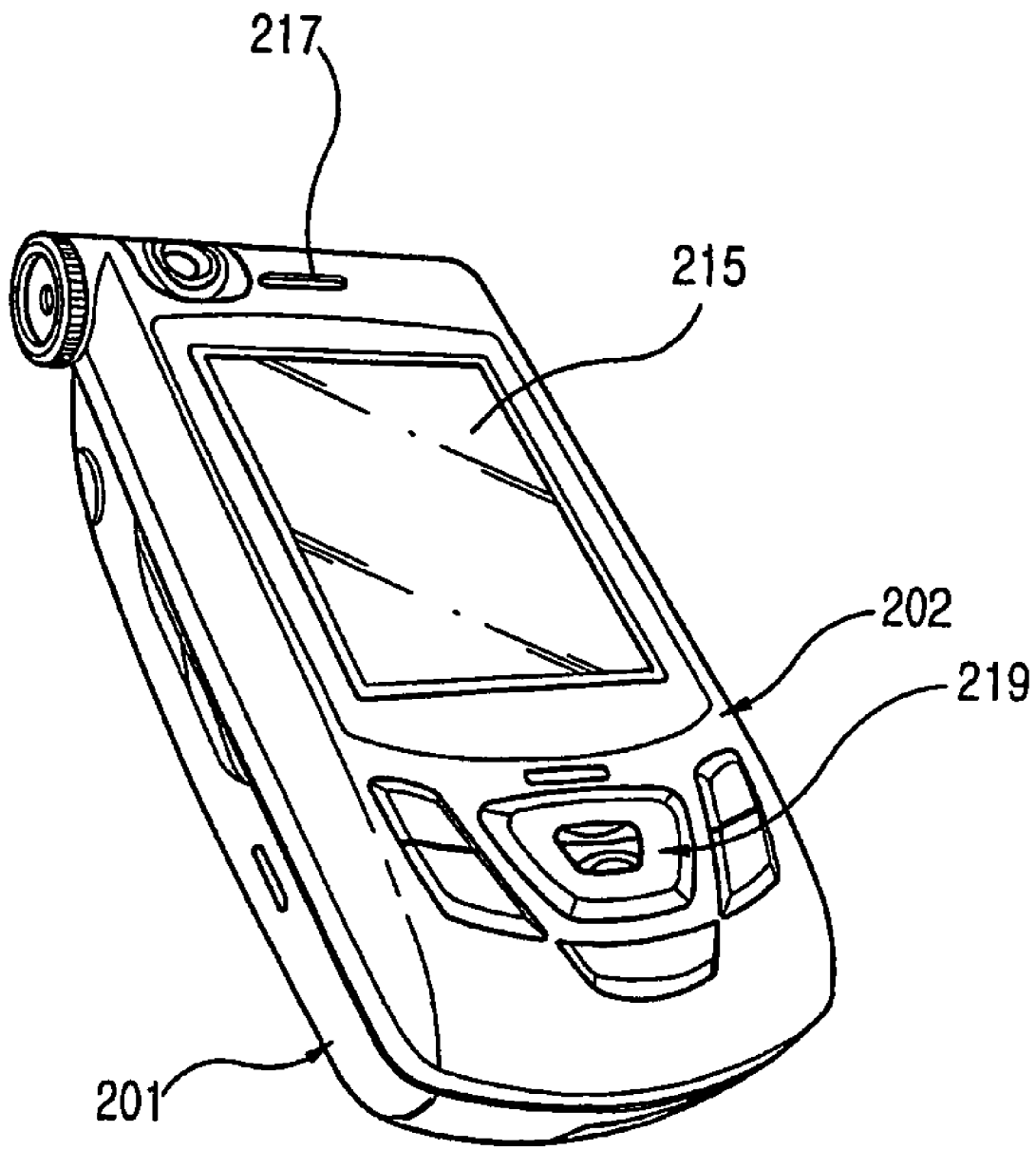
FIG. 3 is an assembled perspective view of the portable wireless terminal shown in FIG. 2.
Figure 4:
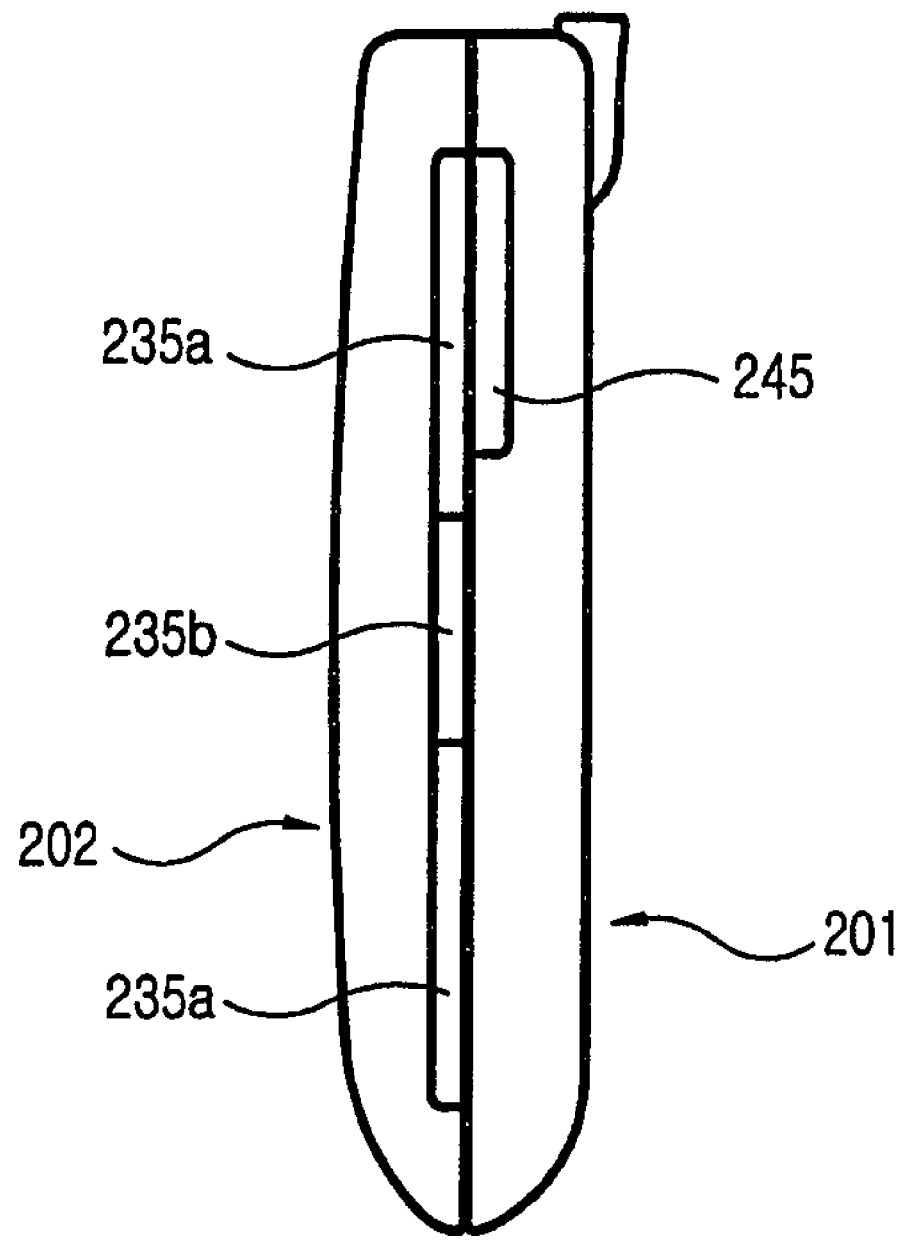
FIG. 4 is a sectional view showing the construction of the portable wireless terminal shown in FIG. 3.

Referring to FIGS. 3 and 4, the sub-body 202 has completely covered the front surface of the main body 201. In this state, the second magnetic bodies 245 face the lower ends of the first magnetic bodies 235 and a drawing force occurs between them, because they have different polarity. As a result, the sub-body 202 keeps covering the main body 201 in a stable manner.

Figure 5:
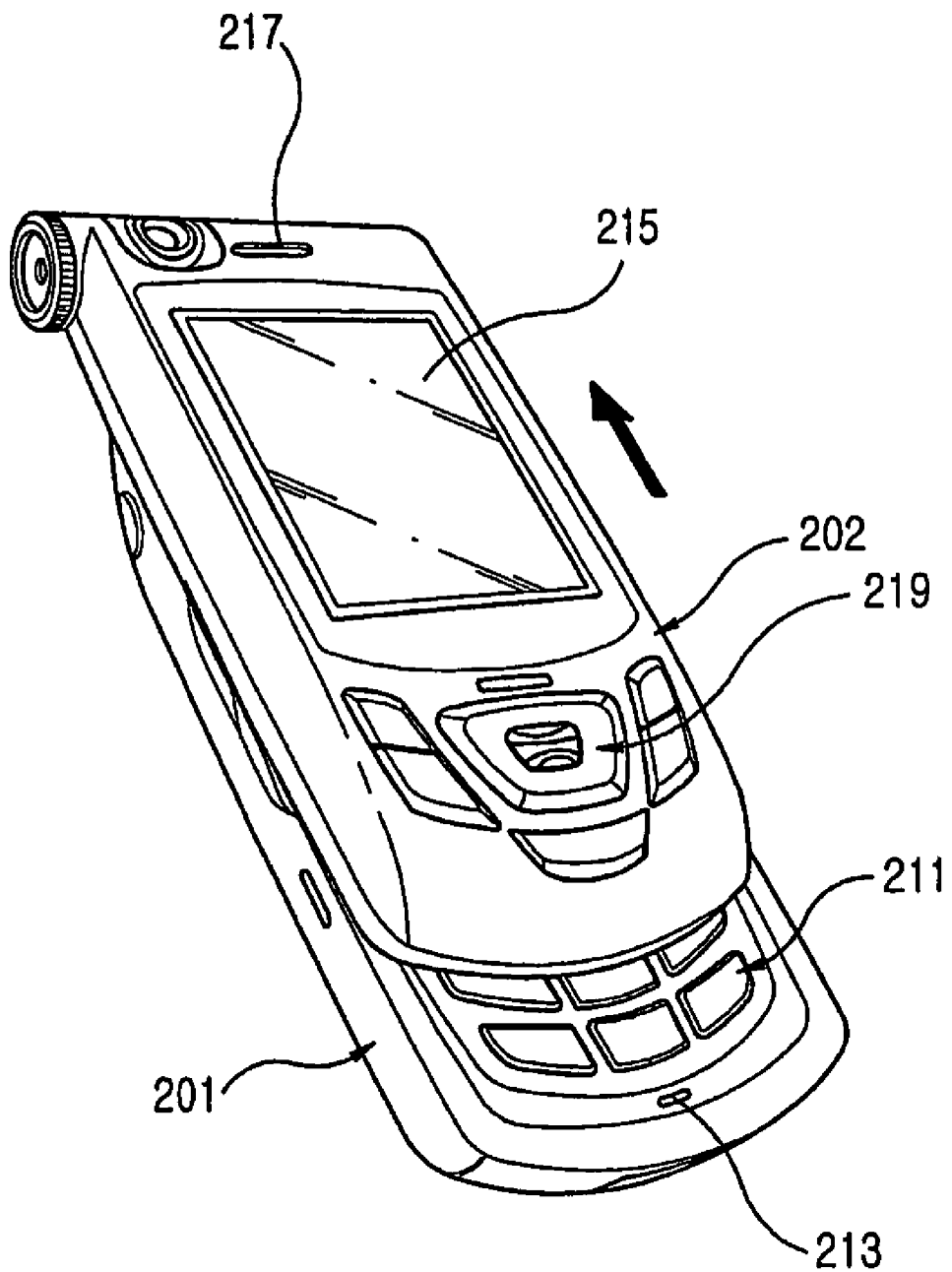
FIG. 5 is a perspective view showing the portable wireless terminal of FIG. 3 wherein its sub-body has opened its main body.
Figure 6:
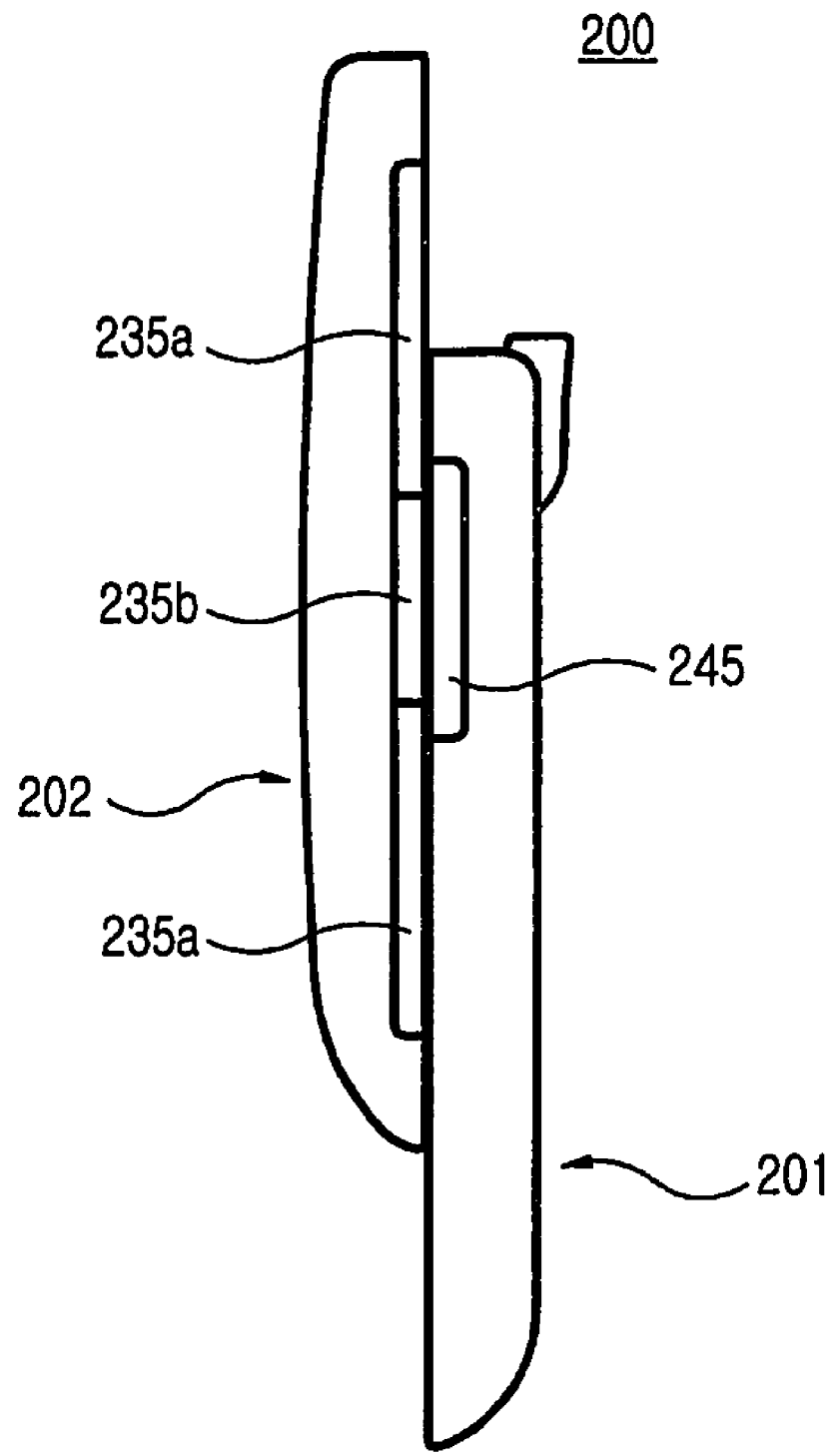
FIG. 6 is a sectional view showing the construction of the portable wireless terminal shown in FIG. 5.

Referring to FIGS. 5 and 6, a user has moved the sub-body 202 toward the upper portion of the main body 201, in order to expose the key pad 211 and the transmitter unit 213 of the main body 211. In this state, the second magnetic bodies 245 face the central portions 235b of the first magnetic bodies 235 and a repulsive force occurs between them, because they have the same polarity. The repulsive force tends to move the second magnetic bodies 245 either toward the upper portions of the first magnetic bodies 235 or toward the lower portions thereof. The second magnetic bodies 245 are moved by the repulsive force either toward the upper portions of the first magnetic bodies 235 or toward the lower portions thereof, depending on the position of the second magnetic bodies 245. In addition, there exists an imbalance in drawing force between the second magnetic bodies 245 and both ends 235a of the first magnetic bodies 235. Such an imbalance tends to move the second magnetic bodies 245 either toward the upper portions of the first magnetic bodies 235 or toward the lower portions thereof, depending on the position of the second magnetic bodies 245.

Figure 7:
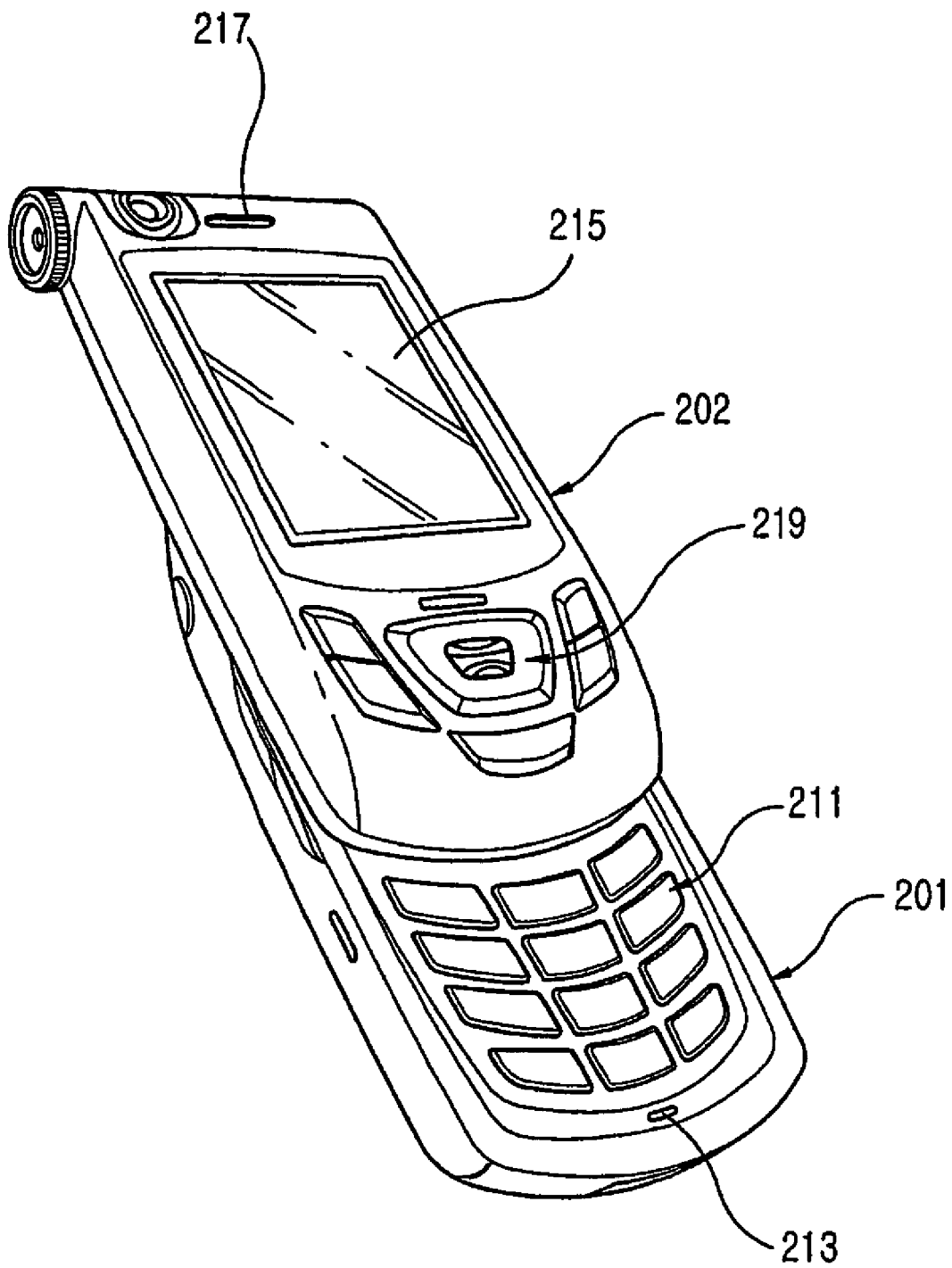
FIG. 7 is a perspective view showing the portable wireless terminal of FIG. 3 wherein its sub-body has opened its main body.
Figure 8:
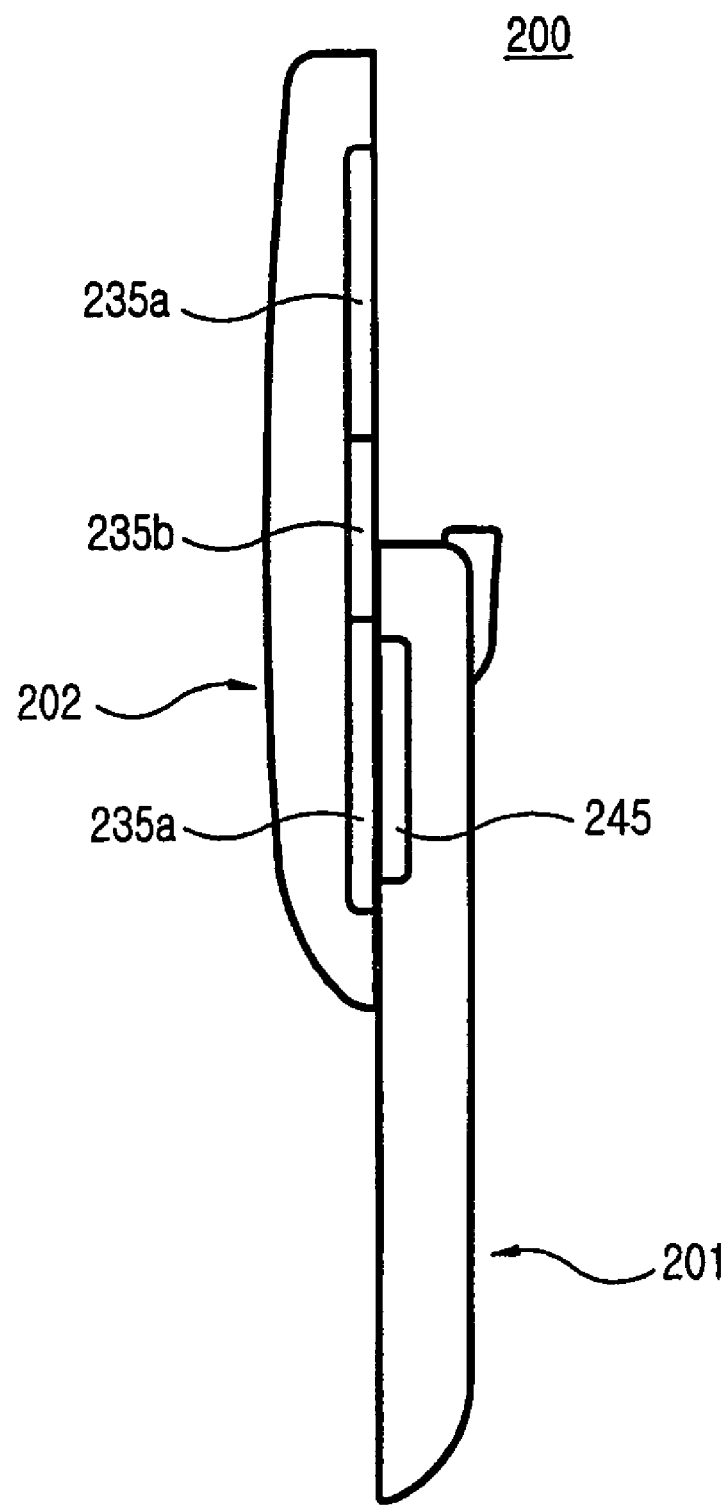
FIG. 8 is a sectional view showing the construction of the portable wireless terminal shown in FIG. 7.

Suppose that a user has moved the sub-body 202 toward the upper portion of the main body 201, more particularly, he has moved the sub-body 202 until the second magnetic bodies 245 are positioned slightly away from the central portions 235b of the second magnetic bodies 245 toward the upper portions thereof. An imbalance then occurs between a repulsive force, which acts between the central portions 235b of the first magnetic bodies 235 and the second magnetic bodies 245, and a drawing force, which acts between both ends 235a of the first magnetic bodies 235 and the second magnetic bodies 245. The imbalance tends to move the second magnetic bodies 245 toward the upper portions of the first magnetic bodies 235. As a result, the sub-body 202 is positioned on the upper portion of the main body 201, as shown in FIGS. 7 and 8, and remains stable due to the drawing force acting between the second magnetic bodies 245 and the upper portions 235a of the first magnetic bodies 235a.

Figure 9:
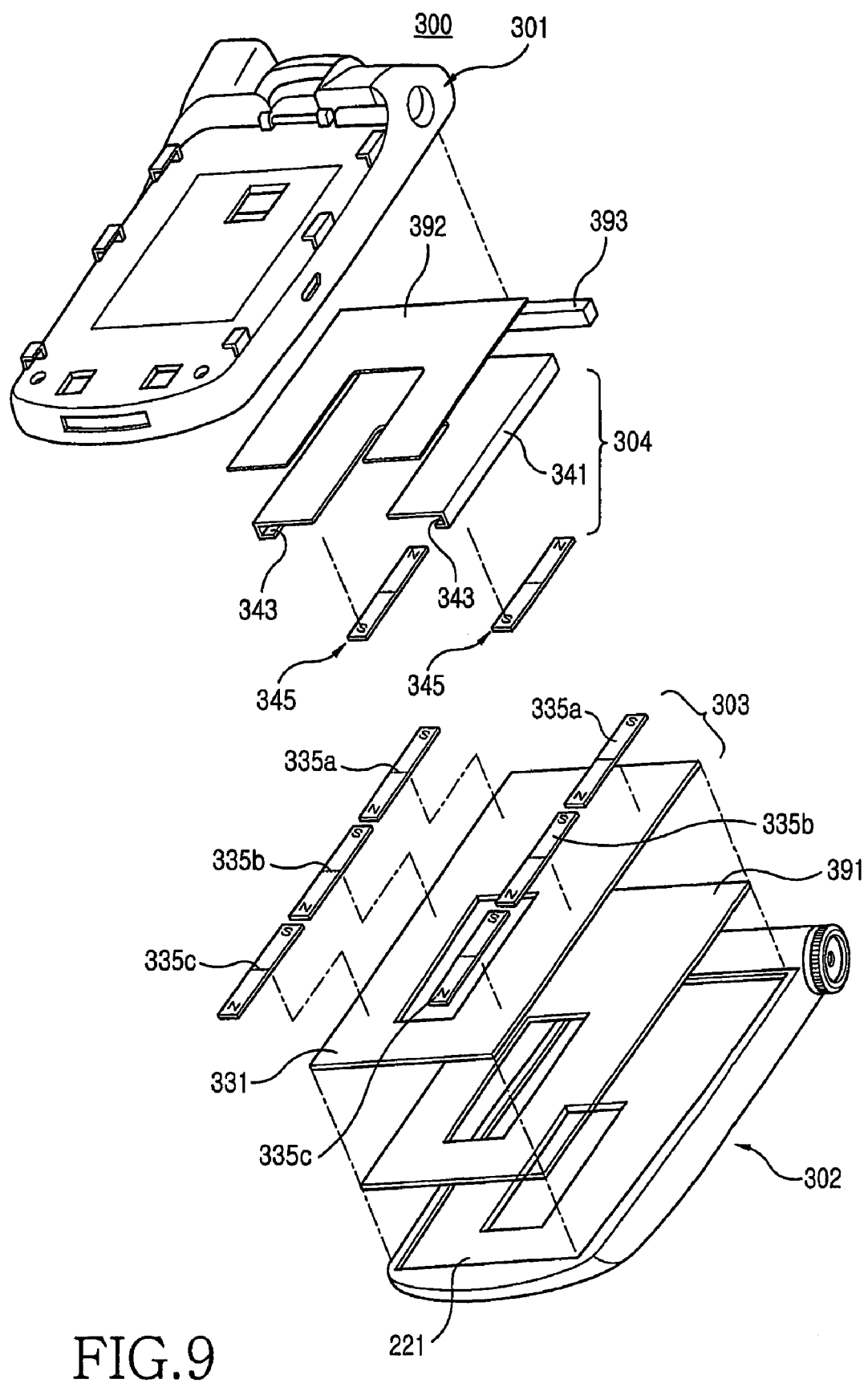
FIG. 9 is an exploded perspective view showing a second preferred embodiment of a driving apparatus of a sliding-type portable wireless terminal using a magnetic body according to the present invention.

FIGS. 9 to 15 are exploded perspective views showing a second preferred embodiment of a driving apparatus of a sliding-type portable wireless terminal 300 using a magnetic body according to the present invention. As shown in FIG. 9, the sliding-type portable wireless terminal 300 has a main body 301, a sub-body 302, and a driving apparatus including first and second magnetic body modules 303 and 304 for coupling the main body 301 and the sub-body 302 to each other in such a manner that they can slide relative to each other. In the following description of the second preferred embodiment of the present invention, the same components as in the previous embodiments are given the same reference numerals and detailed description thereof will be omitted.

Figure 14:
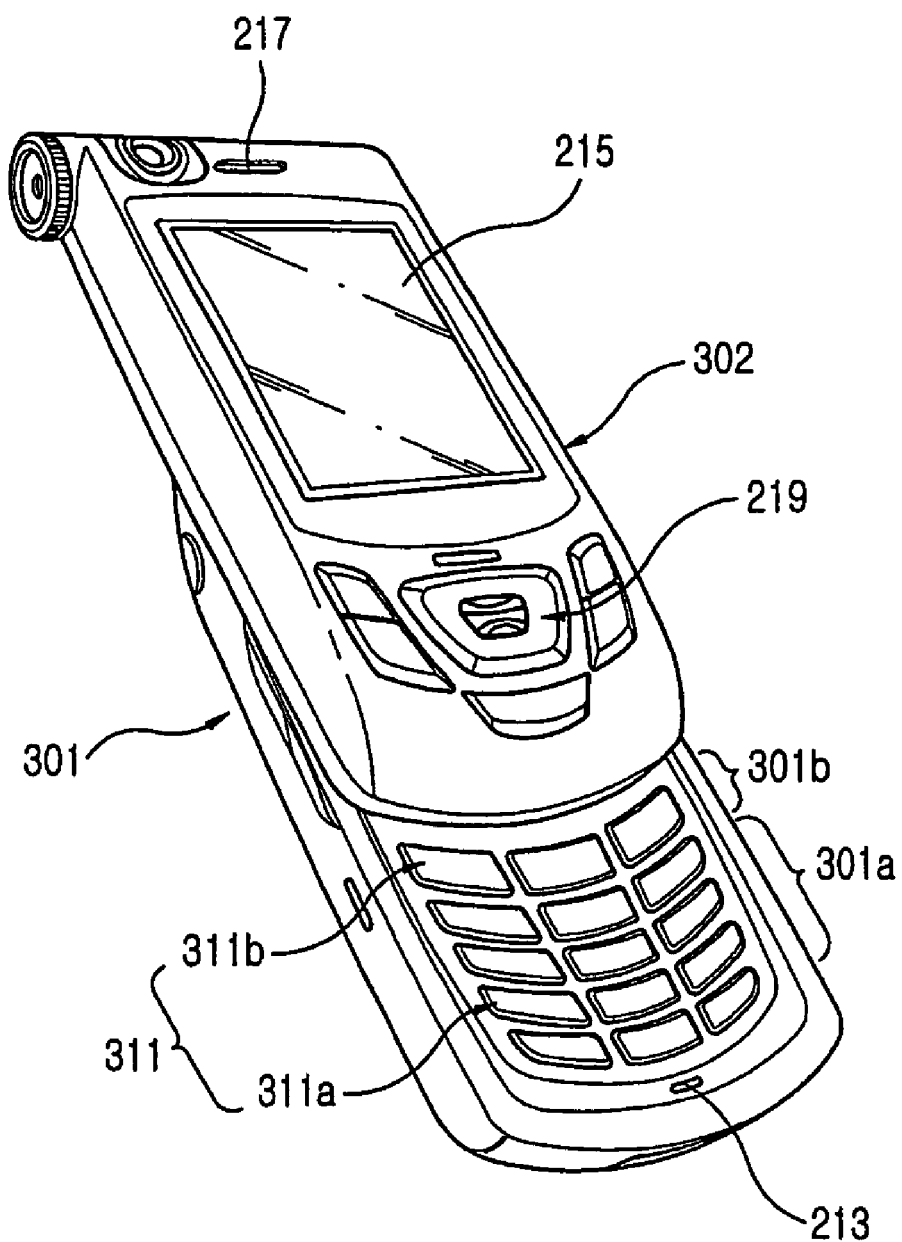
FIG. 14 is a perspective view showing the portable wireless terminal of FIG. 10 wherein its sub-body has opened its main body.

The main body 301 has, on the lower half portion of its front surface, a first key pad 311a (shown in FIG. 14) and a second key pad 311b (shown in FIG. 14). The first and second key pads 311a and 311b are exposed or covered in a stepwise manner as the sub-body 302 slides on the main body 301 along its longitudinal direction.

The driving apparatus is composed of a first magnetic body module 303 positioned on a seating surface 221, which is formed on the rear surface of the sub-body 302, and a second magnetic body module 304 positioned on the front surface of the main body 301.

The first magnetic body module 303 has a first base plate 331 retained on the seating surface 221 of the sub-body 302 and first, second, and third magnetic bodies 335a, 335b, and 335c arranged on a surface of the first base plate 331 along its longitudinal direction. Two rows of first, second, and third magnetic bodies 335a, 335b, and 335c may be arranged parallel to each other. It should be noted that, when arranging the first, second, and third magnetic bodies 335a, 335b, and 335c along the longitudinal direction, N. pole and S. poles must alternate. It would be clear to those skilled in the art the smaller the thickness of the first, second, and third magnetic bodies 335a, 335b, and 335c is, the easier to making the terminal in a compact size.

The second magnetic body module 304 is composed of a second base plate 341 retained on the front surface of the main body 301 and fourth magnetic bodies 345 fastened on the second base plate 341.

The second base plate 341 is provided with guide grooves 343 adapted to surround both lateral ends of the first base plate 331 so that they can slide therein. It would be easily understood by those skilled in the art that, as in the previous embodiment, the first base plate 331 may have sliding guides or guide ribs positioned on both lateral ends thereof to be engaged with the guide grooves 343.

The fourth magnetic bodies 345 are fastened on a surface of the second base plate 341 and face the first, second, and third magnetic bodies 335a, 335b, and 335c, which are fastened on the first base plate 331. The polarity of the fourth magnetic bodies 345 is arranged opposite to that of the first, second, and third magnetic bodies 335a, 335b, and 335c. As a result, the drawing and repulsive forces among the fourth magnetic bodies 345 and the first, second, and third magnetic bodies 335a, 335b, and 335c enable the fourth magnetic bodies 345 to remain stopped upon facing one of the first, second, and third magnetic bodies 335a, 335b, and 335c.

FIGS. 10 to 15 show the successive sliding of the sub-body 302 on the main body 301 of the sliding-type portable wireless terminal 300 configured as above.

Figure 10:
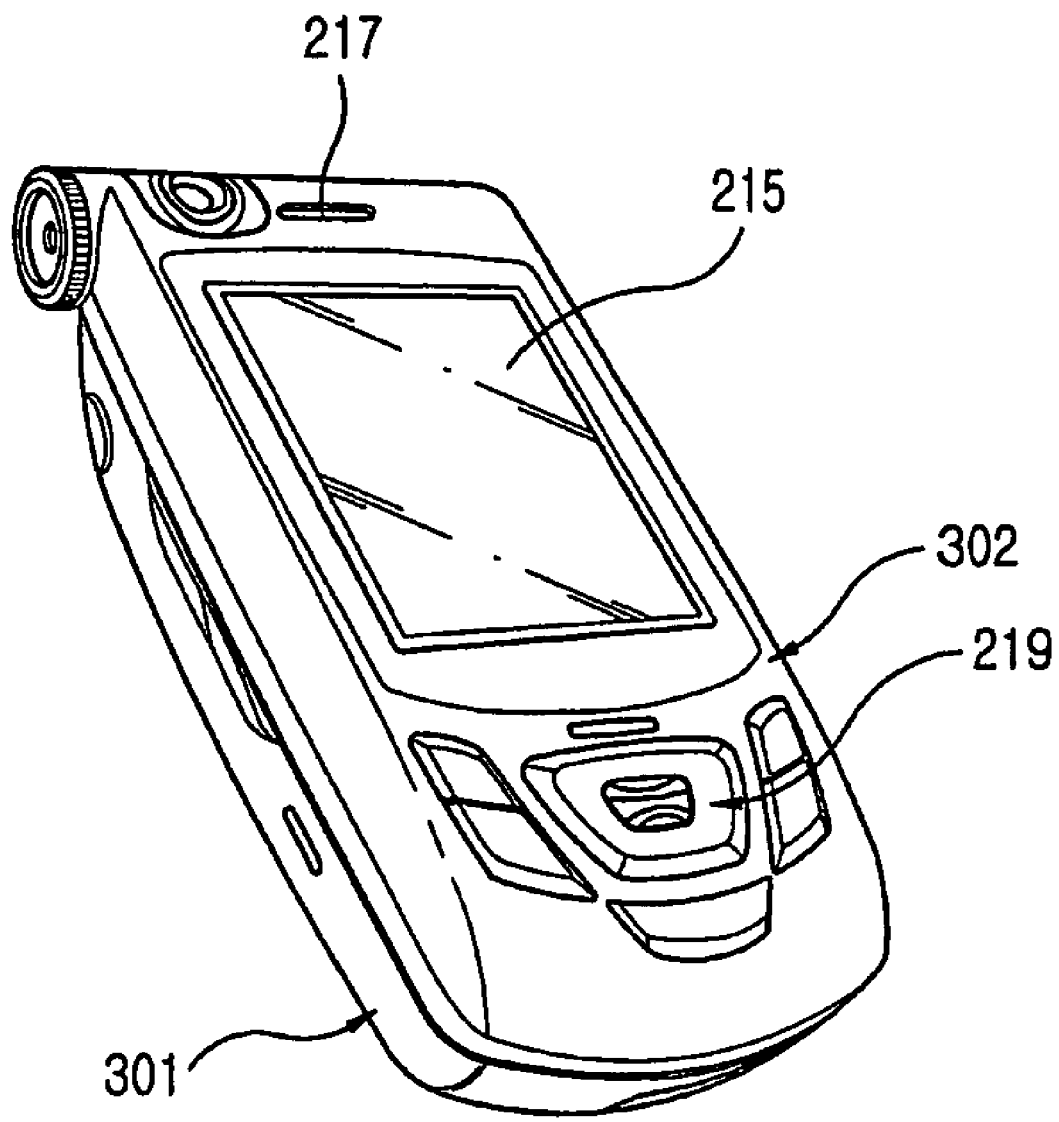
FIG. 10 is an assembled perspective view of the portable wireless terminal shown in FIG. 9.
Figure 11:
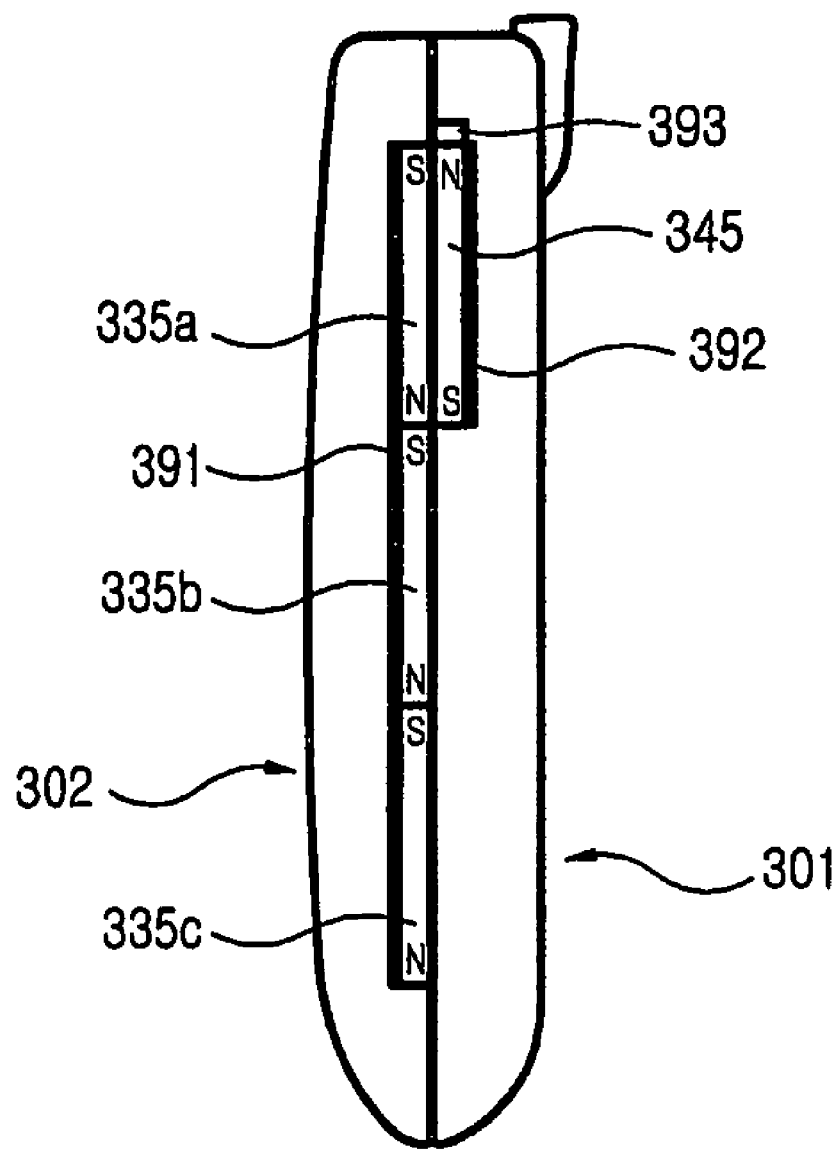
FIG. 11 is a sectional view showing the construction of the portable wireless terminal shown in FIG. 10.

Referring to FIGS. 10 and 11, the sub-body 302 has completely covered the front surface of the main body 301. In this state, the fourth magnetic bodies 345 face the first magnetic bodies 335a. The drawing force between the fourth magnetic bodies 345 and the first magnetic bodies 335a cause the sub-body 302 to keep covering the front surface of the main body 301.

Figure 12:
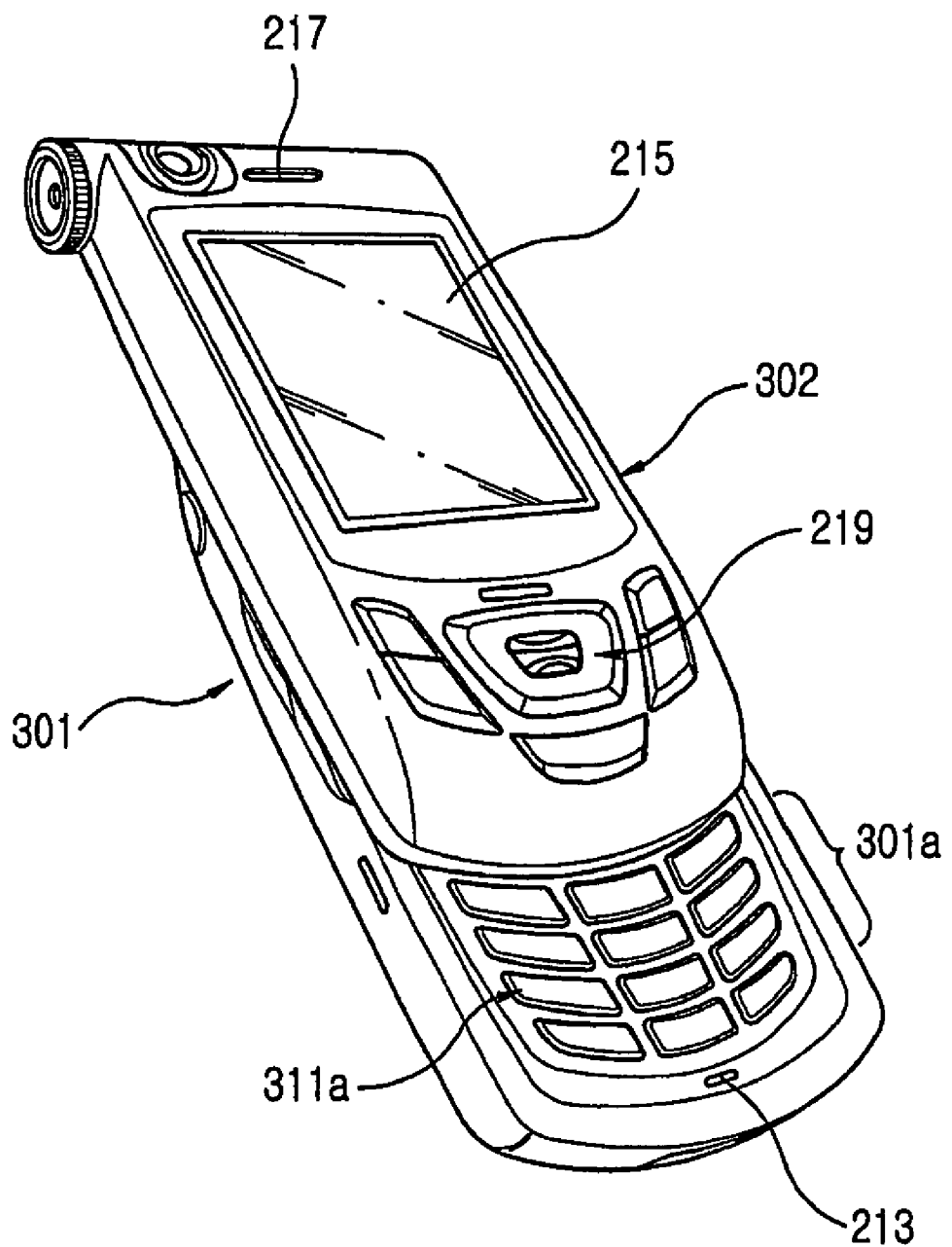
FIG. 12 is a perspective view showing the portable wireless terminal of FIG. 10 wherein its sub-body has opened a part of its main body.
Figure 13:
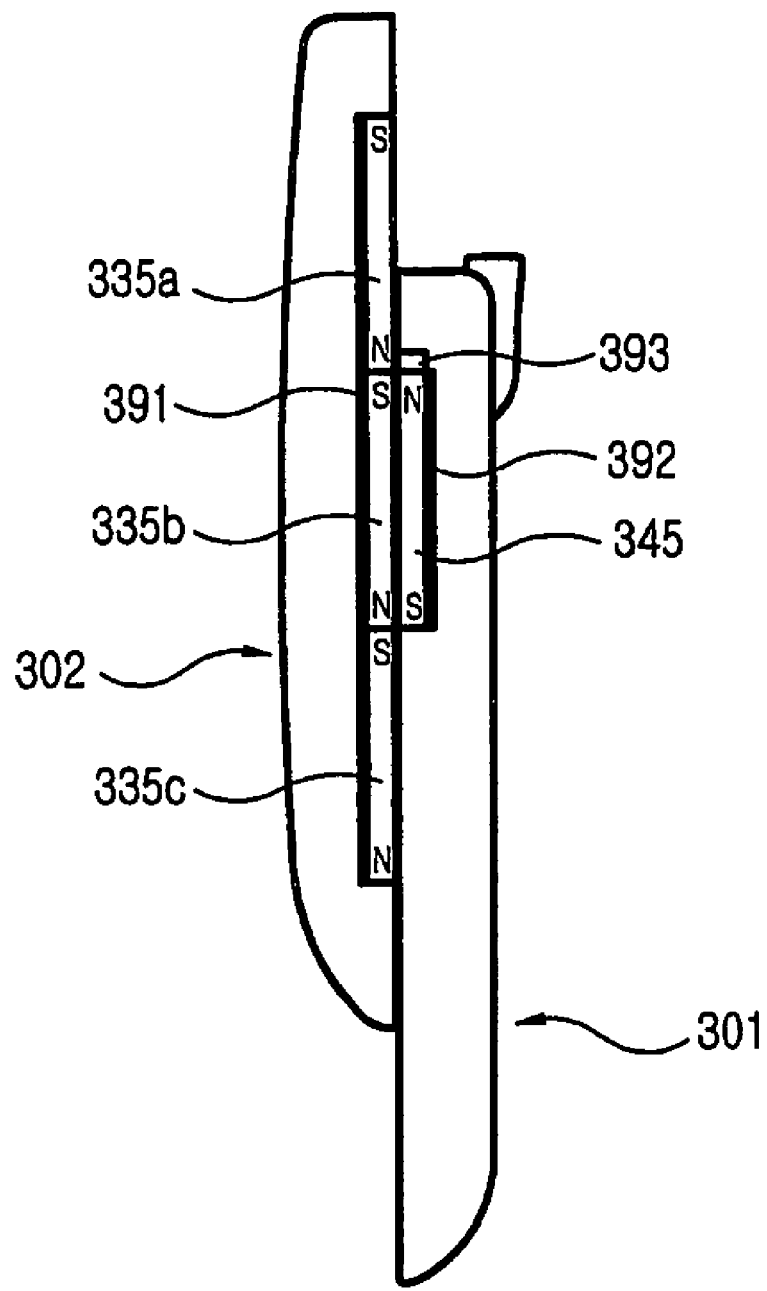
FIG. 13 is a sectional view showing the construction of the portable wireless terminal shown in FIG. 12.

Referring to FIGS. 12 and 13, a user has moved the sub-body 302 toward the upper portion of the main body 301 until the drawing force between the fourth magnetic bodies 345 and the second magnetic bodies 335b becomes larger than that between the fourth magnetic bodies 345 and the first magnetic bodies 335a. The drawing and repulsive forces among the magnetic bodies then cause the sub-body 302 to expose a first region 301a, which is defined in the lower half portion of the front surface of the main body 301. The first key pad 311a is positioned in the first region 301a. The sub-body 302 remains stopped while the fourth magnetic bodies 345 face the second magnetic bodies 335b.

Figure 15:
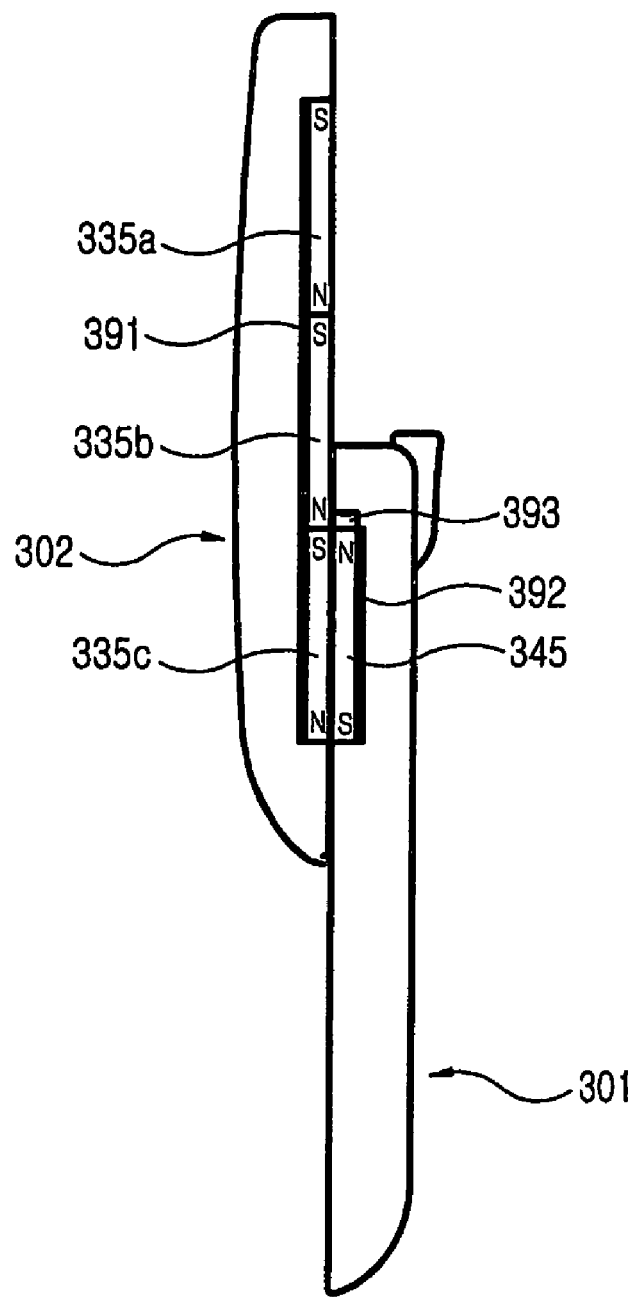
FIG. 15 is a sectional view showing the construction of the portable wireless terminal shown in FIG. 14.
Figure 16:
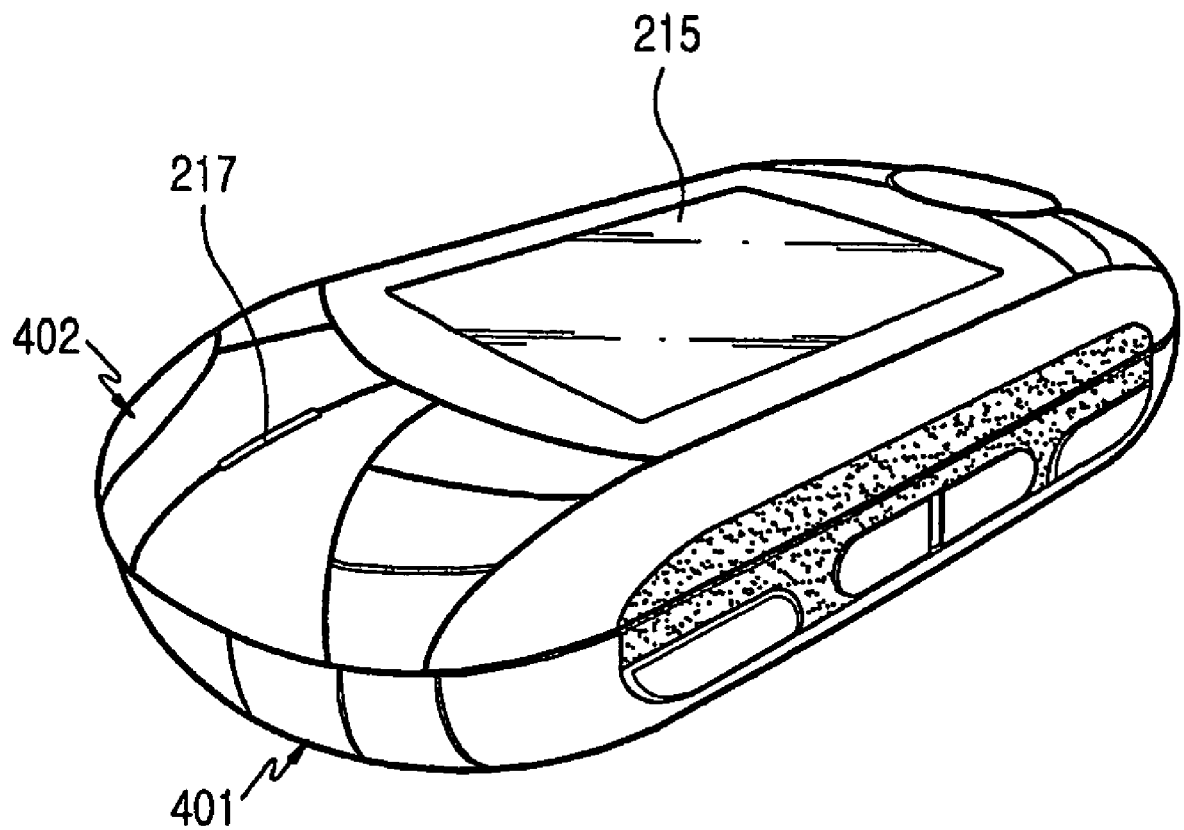
FIG. 16 is a perspective view showing a sliding-type portable wireless terminal having a driving apparatus using a magnetic body according to a third preferred embodiment of the present invention.
Figure 17:
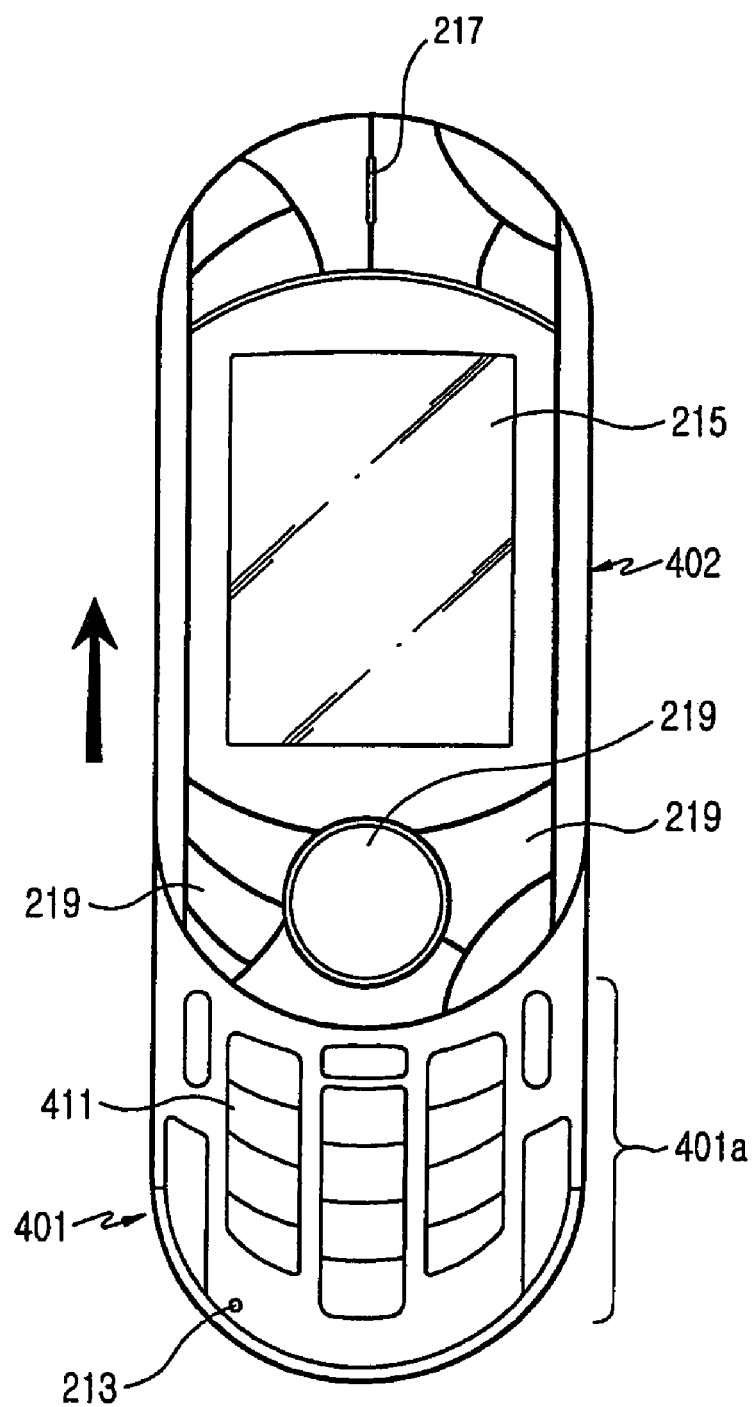
FIG. 17 is a front view showing the portable terminal of FIG. 16 wherein its sub-body has opened a part of its main body.
Figure 18:
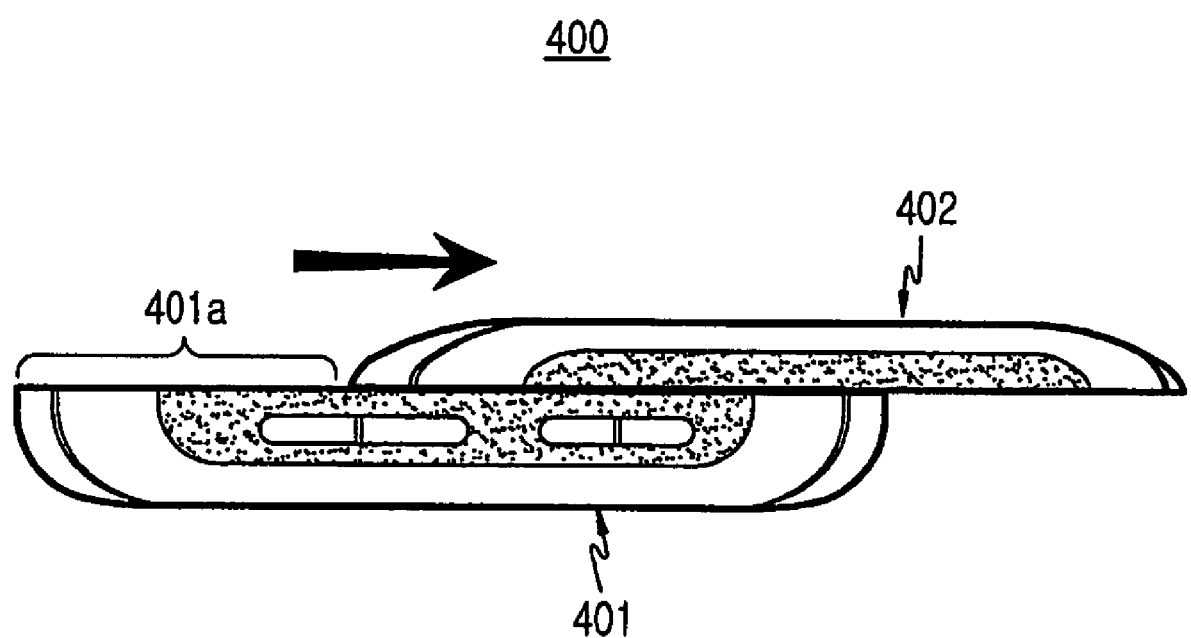
FIG. 18 is a side view of the portable terminal shown in FIG. 17.

Referring to FIGS. 14 and 15, the user has moved the sub-body 302 further from a state wherein the sub-body 302 exposes the first region 301a. Drawing and repulsive forces then occurs among the fourth magnetic bodies 345 and the second and third magnetic bodies 335a and 335b and cause the sub-body 302 to expose a second region 301b, which is defined in the lower half portion of the front surface of the main body 301. The second key pad 311b is positioned in the second region 301b. As mentioned above, the terminal can be endowed with various functions according to the stepwise sliding of the sub-body 302 in such a manner that, for example, the terminal can be set to a standby mode or a PDA mode at a first position, to an entertainment mode including playing games and watching movie clips at a second position, and to a speech mode at a third position.

Meanwhile, the driving apparatus is actuated by the magnetic force from the magnetic bodies, which may affect the operation of the electric circuits of the terminal. In order to prevent this, the first base plate 331, the second base plate 341, or both of the first and second base plates 331 and 341 may be provided with shield members 391 and 392. The shield members 391 and 392 are interposed among the first and second base plate 331 and 341 and the main body 301 and sub-body 302 to minimize the influence of the magnetic force of the magnetic bodies on the electrical circuits of the terminal. The shield members 391 and 392 may be made of a material chosen from a spring steel plate, an electric zinc-plated steel plate, a silicon steel plate, and the like.

When the sub-body 302 is moved toward the upper portion of the main body 301, the rear surface of the sub-body 302 is exposed to the exterior and is likely be contaminated by alien substances. In addition, when the sub-body 302 is again moved and folded on the main body 301, alien substances are likely be interposed between them. Accordingly, the driving apparatus, in particular the upper end of the second base plate, is provided with an elastic barrier member 393 of urethane or rubber material.

FIGS. 16 to 21 show a sliding-type portable wireless terminal 400 having a driving apparatus using a magnetic body according to a third preferred embodiment of the present invention. As shown in FIGS. 16 to 21, the sliding-type portable wireless terminal 400 has a main body 401 and a sub-body 402 coupled to the main body 401 in such a manner that it can slide while facing the main body 401. In the following description of the second preferred embodiment of the present invention, the same components as in the previous embodiments are given the same reference numerals and detailed description thereof will be omitted.

The main body 401 has a key pad 411 and a transmitter unit 213 positioned on a first region 401a, which is defined in the lower end of the upper surface thereof, and a camera lens housing 405 rotatably positioned in a second region 401b, which is defined in the upper end of the upper surface thereof. The lens housing 405 is provided with an exposure window 451 and a flash unit 453 on its front surface. The exposure window 451 makes it possible to take pictures in a range of directions between the front surface and the rear surface of the main body 401, as the lens housing 405 is rotated.

The sub-body 402 has a display unit 215, a transmitter unit 217, and function keys 219 and is adapted to slide on the main body 402 either toward the upper portion of the main body 402 or toward the lower portion thereof. Either the first region 401a or the second region 401b is exposed or covered as the sub-body 402 is slid. The terminal 400 is in a standby mode or in a PDA mode when the sub-body 402 is folded on the main body 401.

In particular, if a user slides the sub-body 402 toward the upper portion of the main body 401, the key pad 411 and the transmitter unit 213, which are positioned in the first region 401a, are exposed and the terminal 400 is switched to a speech mode. If the user slides the sub-body 402 toward the lower portion of the main body 402, the second region 401b is exposed. The user now can take pictures of the user himself using the lens housing 405.

Figure 19:
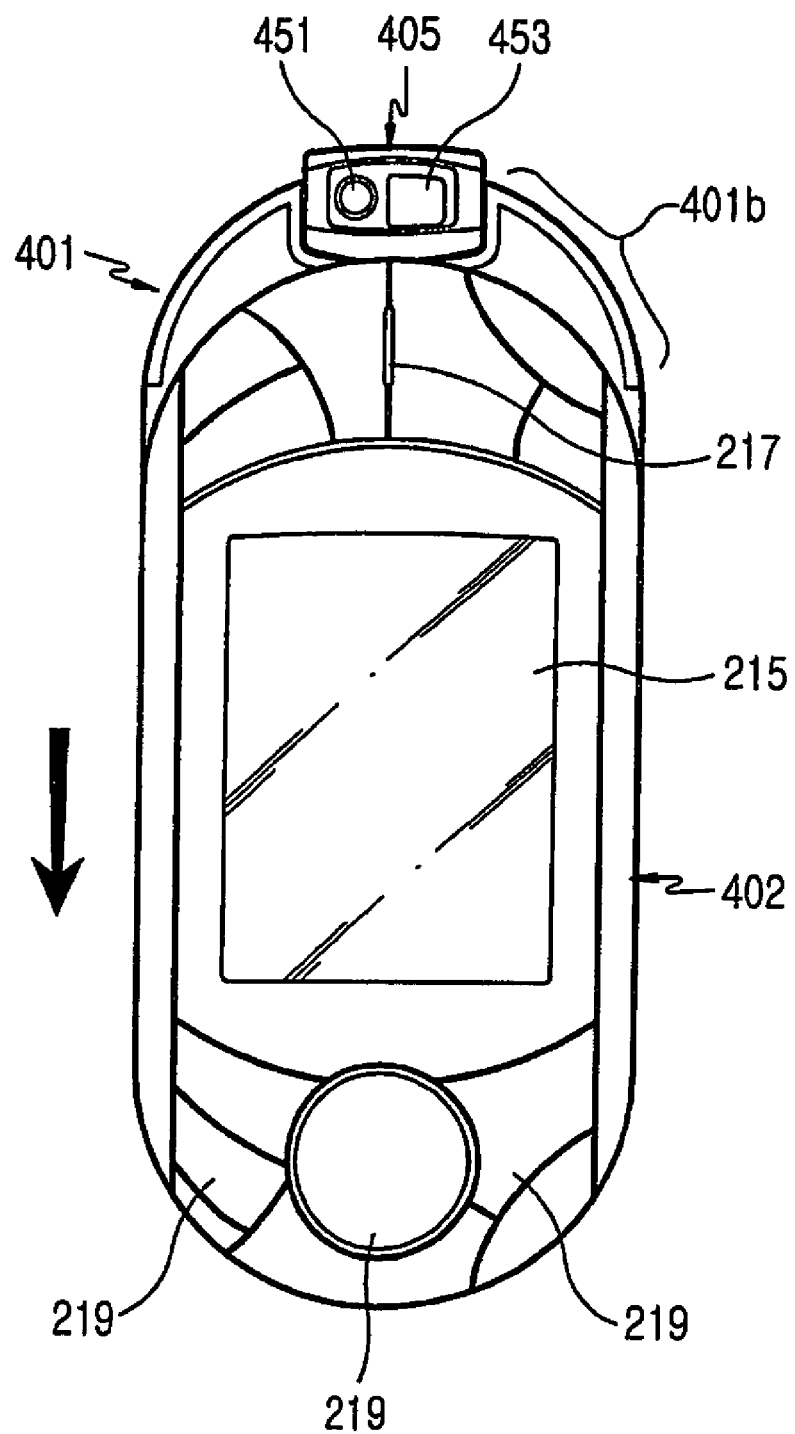
FIG. 19 is a front view showing the portable terminal of FIG. 16 wherein its sub-body has opened another part of its main body.
Figure 20:
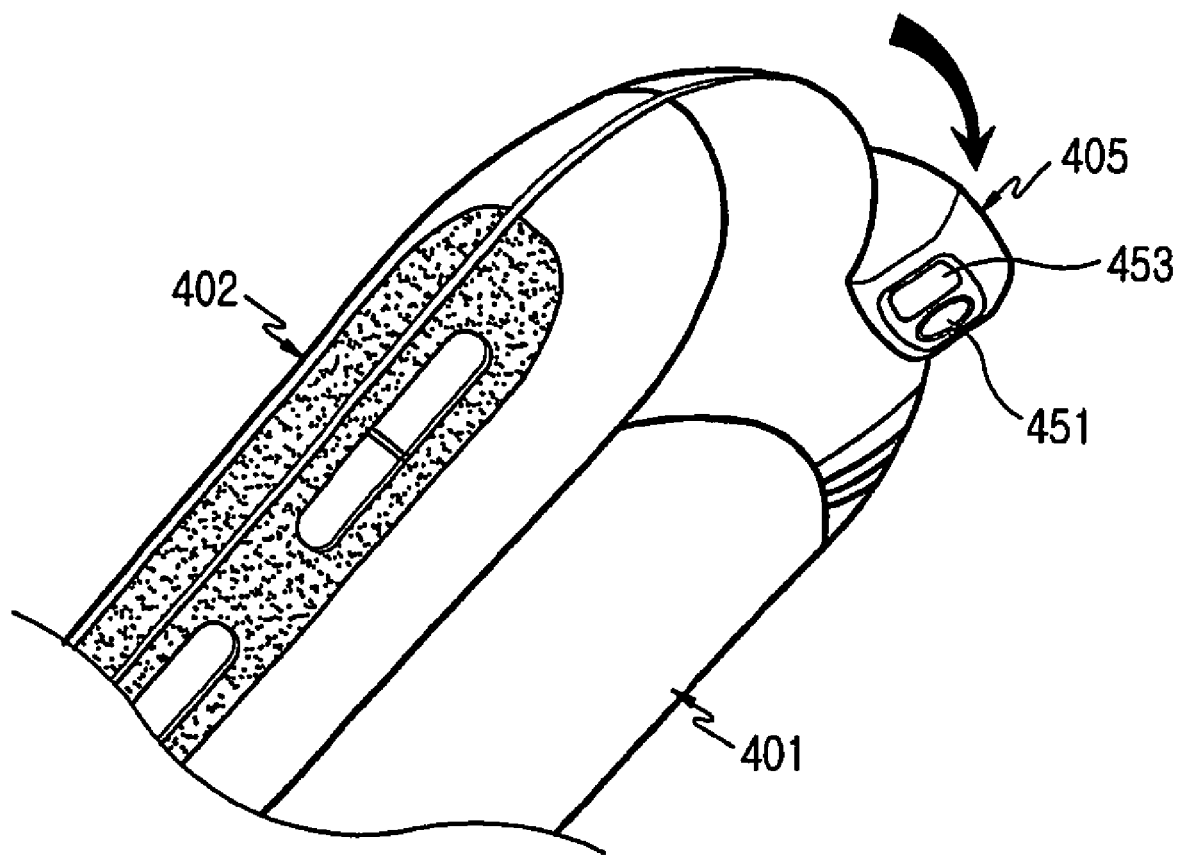
FIG. 20 is a perspective view showing the portable terminal of FIG. 16 wherein its lens housing is rotated.
Figure 21:
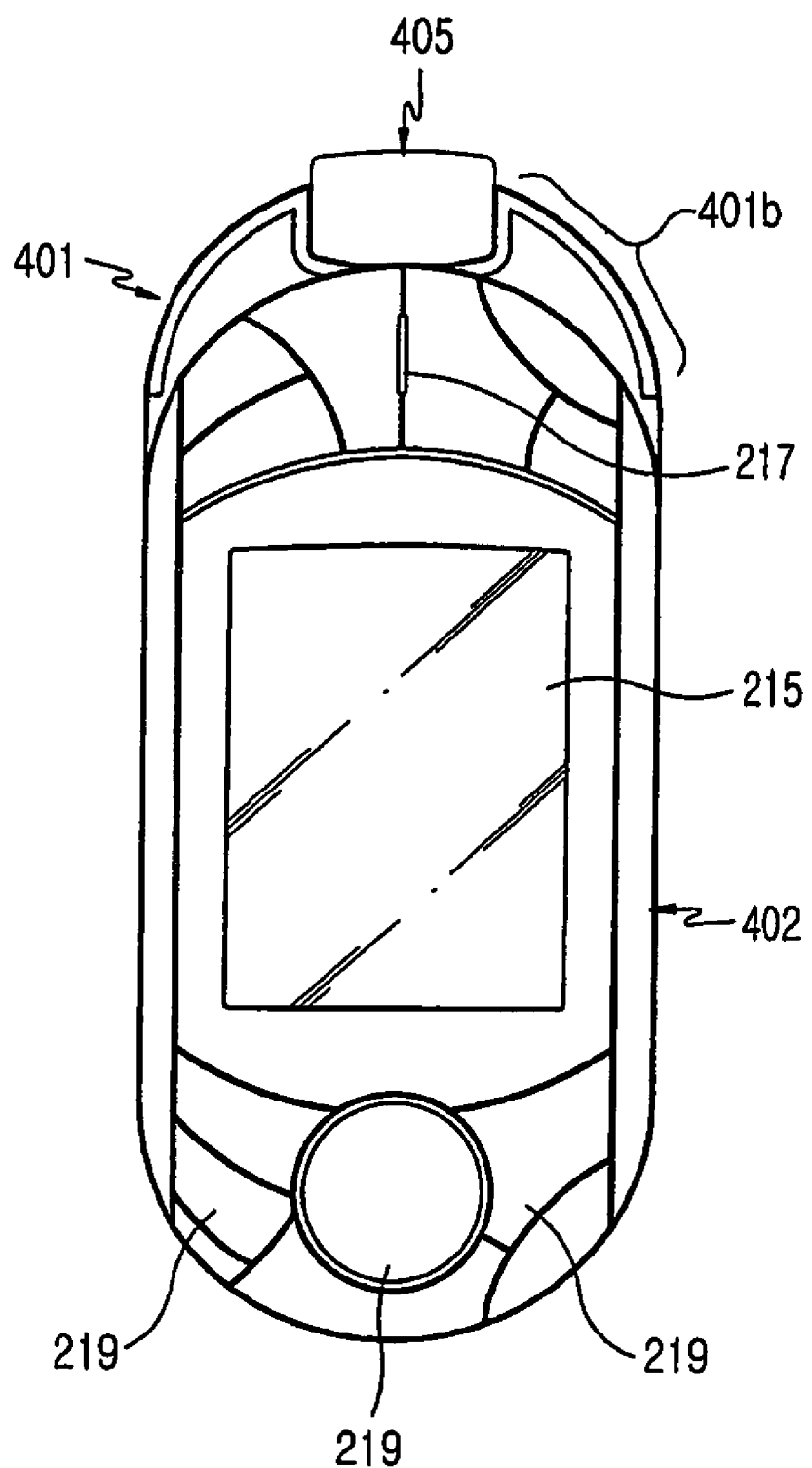
FIG. 21 is a front view showing the portable terminal of FIG. 19 wherein its lens housing is rotated.

Referring to FIGS. 19 to 21, the lens housing 405 is adapted to be rotated regardless of whether the sub-body 402 is slid or not. Therefore, it is also possible to take pictures of desired objects even when the sub-body 402 is folded on the main body 401. Of course, it is possible to take pictures of both the user himself and desired objects when the sub-body 402 is slid toward the lower portion of the main body 401.

The driving apparatus according to the third embodiment of the present invention has the same construction with that of the second embodiment. Accordingly, the stepwise sliding of the terminal 400 will now be described with reference to the driving apparatus shown in FIG. 9.

In a first position wherein the sub-body 402 is folded on the main body 401, the fourth magnetic bodies 345 face the second magnetic bodies 335b. In a second position wherein a user has moved the sub-body 402 toward the upper portion of the main body 401, the fourth magnetic bodies 345 face the third magnetic bodies 335c. In a third position wherein the sub-body 402 is moved toward the lower portion of the main body 401, the fourth magnetic bodies 345 face the first magnetic bodies 335a.

The sub-body 402 completely covers the front surface of the main body 401 in the first position. The sub-body 402 exposes only the first region 401a of the main body 401 in the second position and only the second region 401b thereof in the third position.

It is obvious that the area occupied by the first region 401 is larger than that by the second region 401b. In other words, the area necessary for installing the key pad 411 and the transmitter unit 213 is larger than that for installing the lens housing 405. Accordingly, the distance the sub-body 402 can travel toward the upper portion of the main body 401 is larger than that toward the lower portion thereof. This is made possible by adjusting the length of the first, second, and third magnetic bodies 335a, 335b, and 335c or the spacing among them. For example, the traveling distance of the sub-body 402 can be modified by increasing the spacing between the second and third magnetic bodies 335b and 335c, which face the fourth magnetic bodies 345 in the first and second positions, or by increasing the length of the second magnetic bodies 335b while that of the third magnetic bodies 335c is shorten accordingly. Such modification of the traveling distance of the sub-body can also be applied to the relationship between the first and third positions in the same manner.

INDUSTRIAL APPLICABILITY

As can be seen from the foregoing, the driving apparatus of a sliding-type portable wireless terminal according to the present invention can realize smooth sliding of the sub-body by using magnetic bodies as means to generate the driving force necessary for sliding the sub-body on the main body. It has minimized friction among components, because the driving force is generated by a drawing force or a repulsive force among the magnetic bodies. The minimized friction among components also makes it possible to prevent the shortening of the service life of the product due to noise and wear. The driving apparatus is adapted to slide the sub-body in a stepwise manner, so that the key pads can be exposed in a stepwise manner or the upper end of the main body or the lower end thereof can be exposed selectively. Consequently, the terminal can be endowed with different functions and used for various purposes according to the stepwise sliding of the sub-body.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A driving apparatus of a sliding-type portable wireless terminal using a magnetic body, the terminal having a main body and a sub-body adapted to slide along a longitudinal direction of the main body to be opened/closed, the driving apparatus comprising:
   a first magnetic body module positioned on a rear surface of the sub-body and having a first magnetic body fastened thereon, which has a first predetermined polarity and which extends along a longitudinal direction thereof; and
   a second magnetic body module positioned on a front surface of the main body and having a second magnetic body fastened thereon, which has a second predetermined polarity different from the first predetermined polarity and faces the first magnetic body;
   wherein the second magnetic body faces a portion of the first magnetic body when the main body is opened and the second magnetic body faces another portion of the first magnetic body when the main body is closed; and
   wherein the sub-body slides on the main body by a drawing force exerted between the second magnetic body and one of the portions of the first magnetic body.

2. The driving apparatus of a sliding-type portable wireless terminal using a magnetic body as claimed in claim 1, wherein the magnetic body of the first magnetic body module has a polarity, in both ends thereof, which exerts a drawing force in relation to the magnetic body of the second magnetic body module and another polarity, in the central portion thereof, which exerts a repulsive force in relation to the magnetic body of the second magnetic body module.

3. The driving apparatus of a sliding-type portable wireless terminal using a magnetic body as claimed in claim 1, wherein the first magnetic body module has a first base plate fastened on the rear surface of the sub-body, a pair of sliding guides fastened on a surface of the first base plate and extending along the longitudinal direction of the first base plate, and the magnetic body fastened on a surface of the first base plate.

4. The driving apparatus of a sliding-type portable wireless terminal using a magnetic body as claimed in claim 3, wherein the second magnetic body module has a second base plate adapted to face the first base plate and sliding grooves formed on a surface of the second base plate to be engaged with the sliding guides for sliding, and the magnetic body of the second magnetic body module is fastened on a surface of the second base plate and faces the magnetic body of the first magnetic body module, which is fastened on a surface of the first base plate.

5. The driving apparatus of a sliding-type portable wireless terminal using a magnetic body as claimed in claim 1, wherein the first and second magnetic body modules are provided with shield members so that the magnetic force from the magnetic bodies, which are fastened thereon, cannot be discharged out of the driving apparatus.

6. The driving apparatus of a sliding-type portable wireless terminal using a magnetic body as claimed in claim 5, wherein the first magnetic body module has a first base plate fastened on the rear surface of the sub-body, the second magnetic body module has a second base plate fastened on the front surface of the main body and coupled to the first base plate in such a manner that it can slide while facing the first base plate, and the shield members are positioned on respective surfaces of the first and second base plates.

7. The driving apparatus of a sliding-type portable wireless terminal using a magnetic body as claimed in claim 5, wherein the shield members are made of a material selected from the group consisting of a spring steel plate, an electric zinc-plated steel plate, and a silicon steel plate.

8. A driving apparatus of a sliding-type portable wireless terminal using a magnetic body, the terminal having a main body and a sub-body adapted to slide along a longitudinal direction of the main body to be opened/closed, the driving apparatus comprising:
   a first magnetic body module positioned on a rear surface of the sub-body and having a first magnetic body fastened thereon, which has a predetermined polarity and which extends along a longitudinal direction thereof; and
   a second magnetic body module positioned on a front surface of the main body and having a second magnetic body fastened thereon, which has a predetermined polarity and faces the first magnetic body;
   wherein the second magnetic body faces a portion of the first magnetic body when the main body is opened and the second magnetic body faces another portion of the first magnetic body when the main body is closed;
   wherein the sub-body slides on the main body by a drawing force exerted between the second magnetic body and one of the portions of the first magnetic body; and
   wherein the first magnetic body module includes three pairs of N. and S. poles alternated along the longitudinal direction thereof and the second magnetic body module includes S. and N. poles so that the sub-body can be stopped in first, second, and third positions as it slides on the main body.

9. The driving apparatus of a sliding-type portable wireless terminal using a magnetic body as claimed in claim 8, wherein the main body has first and second regions defined in series along the longitudinal direction thereof in the lower half portion of the front surface thereof, and the sub-body is adapted to completely cover both the first and second regions when stopped in the first position, to expose only the first region when stopped in the second position, and to expose both the first and second regions when stopped in the third position.

10. The driving apparatus of a sliding-type portable wireless terminal using a magnetic body as claimed in claim 8, wherein the first magnetic body module has first, second, and third magnetic bodies having the polarity of N. and S. poles and arranged linearly along the longitudinal direction thereof.

11. The driving apparatus of a sliding-type portable wireless terminal using a magnetic body as claimed in claim 8, wherein the main body has a first region defined in the lower end of its front surface and a second region in the upper end thereof, and the sub-body is adapted to completely cover both the first and second regions when stopped in the first position, to expose the first region when stopped in the second position, and to expose the second region when stopped in the third position.

* * * * *